United States Patent
Sazai et al.

(10) Patent No.: US 11,630,320 B2
(45) Date of Patent: Apr. 18, 2023

(54) OPTICAL ASSEMBLY WITH SHAKE CORRECTION FUNCTION

(71) Applicant: Nidec Corporation, Kyoto (JP)

(72) Inventors: Kazuhiro Sazai, Kyoto (JP); Tomohiro Egawa, Kyoto (JP); Takayuki Iwase, Kyoto (JP); Genki Tanaka, Kyoto (JP); Tsutomu Arai, Kyoto (JP); Shinji Minamisawa, Kyoto (JP); Takeshi Sue, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 198 days.

(21) Appl. No.: 17/161,722

(22) Filed: Jan. 29, 2021

(65) Prior Publication Data

US 2021/0240003 A1     Aug. 5, 2021

(30) Foreign Application Priority Data

Jan. 30, 2020   (JP) .............................. JP2020-013919

(51) Int. Cl.
*G02B 27/64* (2006.01)
*G03B 5/06* (2021.01)

(52) U.S. Cl.
CPC ............. *G02B 27/646* (2013.01); *G03B 5/06* (2013.01); *G03B 2205/0023* (2013.01)

(58) Field of Classification Search
None
See application file for complete search history.

(56) References Cited

U.S. PATENT DOCUMENTS

| | | | |
|---|---|---|---|
| 2016/0170227 A1* | 6/2016 | Minamisawa | H04N 5/2257 359/557 |
| 2017/0118411 A1* | 4/2017 | Morinaga | H04N 5/2251 |
| 2017/0280036 A1 | 9/2017 | Morinaga | |
| 2018/0129065 A1* | 5/2018 | Minamisawa | G02B 7/08 |
| 2018/0321506 A1* | 11/2018 | Minamisawa | H04N 5/23264 |
| 2021/0240001 A1* | 8/2021 | Tanaka | G02B 27/646 |

FOREIGN PATENT DOCUMENTS

| | | |
|---|---|---|
| CN | 206788493 U | 12/2017 |
| CN | 109212866 A | 1/2019 |
| JP | 2017-116861 A | 6/2017 |

OTHER PUBLICATIONS

Official Communication issued in corresponding Chinese Patent Application No. 202110102596.6, dated Feb. 25, 2022.

\* cited by examiner

*Primary Examiner* — Derek S. Chapel
(74) *Attorney, Agent, or Firm* — Keating & Bennett

(57) ABSTRACT

An optical assembly includes a movable body that includes an optical module, a frame body radially outward of the movable body, and support portions that swingably support the movable body with respect to the frame body. Each of the support portions includes a guide portion between the movable body and the frame body to support the movable body, and a preload portion that pushes the guide portion toward the movable body. A radially inner end portion of the preload portion is connected to a radially outer end portion of the guide portion. A radially outer end portion of the preload portion is supported by the frame body. One of the movable body and the guide portion includes a first convex surface, and the other includes a first concave surface in contact with the first convex surface.

10 Claims, 6 Drawing Sheets

OPTICAL ASSEMBLY WITH SHAKE CORRECTION FUNCTION

CROSS REFERENCE TO RELATED APPLICATION

The present invention claims priority under 35 U.S.C. § 119 to Japanese Patent Application No. 2020-013919 filed on Jan. 30, 2020, the entire contents of which are hereby incorporated herein by reference.

1. FIELD OF THE INVENTION

The present disclosure relates to an optical assembly with a shake correction function.

2. BACKGROUND

Some optical assemblies mounted on a mobile terminal or a mobile unit includes a mechanism for correcting shake by swinging or rotating a movable body provided with a lens to curb the disturbance of a captured image when the mobile terminal or the mobile unit is moving.

Regarding such an optical assembly, an imaging device that corrects image blur includes a movable member, a support means, and a drive means, for example. The movable member supports at least a part of an imaging means that obtains a subject image. The support means supports the movable member with respect to the fixed member, so that the movable member can swing about the sphere center around a swing center point on the optical axis of an optical system forming the imaging means. The drive means applies thrust to the movable member to correct the image blur due to the swing about the sphere center. The support means includes a supported surface, a holding member, multiple fixed-position balls, and multiple adjusting balls. The supported surface is provided on the movable member, and is formed of a part of a spherical surface centered on the swing center point. The holding member can move with respect to the fixing member in the contacting/separating direction that changes the distance from the supported surface. The multiple fixed-position balls are provided between the fixed member and the movable member at different positions in the circumferential direction centered on the optical axis and at the same position in the direction extending along the optical axis. Each of the multiple fixed-position balls is held at a constant position with respect to the fixing member and makes point contact with the supported surface. The multiple adjusting balls are provided at different positions in the circumferential direction centered on the optical axis and at positions different from the multiple fixed-position balls in the direction extending along the optical axis. Each of the multiple adjusting balls is held between the supported surface and the holding member and makes point contact with the supported surface.

However, in the configuration in which the support mechanism for supporting the movable body includes multiple balls that roll between the fixed body and the movable body, it is not easy to handle the multiple balls at the time of manufacturing the device. Hence, there is a problem that it is difficult to improve productivity of the optical assembly.

SUMMARY

Example embodiments of the present disclosure correct a shake of an optical module. An optical assembly according to an example embodiment of the present disclosure with a shake correction function includes a movable body, a frame body, and support portions. The movable body includes the optical module. The frame body is radially outward of the movable body in a radial direction with respect to an optical axis of the optical module. The support portions swingably support the movable body with respect to the frame body. Each of the support portions includes a guide portion and a preload portion. The guide portion is between the movable body and the frame body to support the movable body. A radially inner end portion of the preload portion is connected to a radially outer end portion of the guide portion. A radially outer end portion of the preload portion is supported by the frame body. One of the movable body and the guide portion includes a first convex surface protruding from the one of the movable body and the guide portion toward the other of the movable body and the guide portion. The other of the movable body and the guide portion includes a first concave surface in contact with the first convex surface. The first convex surface and the first concave surface have a spherical shape. The preload portion pushes the guide portion toward the movable body.

The above and other elements, features, steps, characteristics and advantages of the present disclosure will become more apparent from the following detailed description of the example embodiments with reference to the attached drawings.

DETAILED DESCRIPTION

Figure 1:
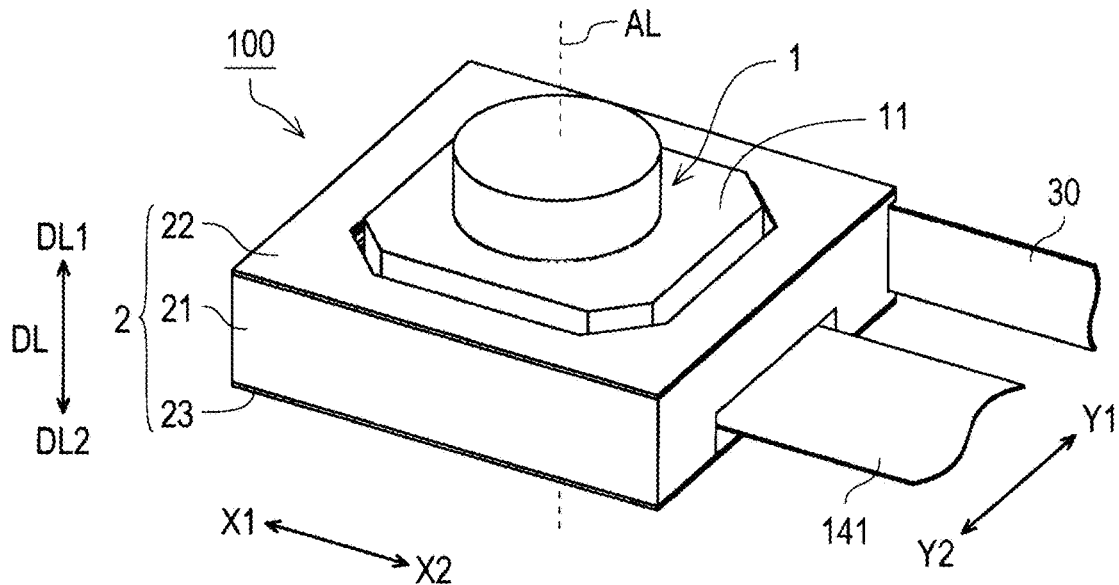
FIG. 1 is a perspective view of an optical assembly according to an example embodiment of the present invention.

Hereinafter, example embodiments will be described with reference to the drawings.

Note that in the present specification, in an optical assembly 100, a state in which a movable body 1 is stopped and the swing angle of the movable body 1 with respect to a fixed body 2 in the pitching direction and the yawing direction is 0 degrees is referred to as "a state where the movable body 1 is stationary". Additionally, the optical axis of an optical module 11 in a state where the movable body 1 is stationary is referred to as a "static optical axis AL".

A direction parallel to the static optical axis AL is referred to as "optical axis direction DL". Of the optical axis directions DL, a direction from a bottom cover 23 to a top cover 22, which will be described later, is referred to as "one optical axis direction DL1", and a direction from the top cover 22 to the bottom cover 23 is referred to as "other optical axis direction DL2". In each component, an end portion in the one optical axis direction DL1 is referred to as "one optical axis direction end portion", and an end portion in the other optical axis direction DL2 is referred to as "other optical axis direction end portion". Additionally, of the side surfaces of each component, a surface facing the one optical axis direction DL1 is referred to as "one optical axis direction end surface", and a surface facing the other optical axis direction DL2 is referred to as "other optical axis direction end surface".

Additionally, the two axes orthogonal to the static optical axis AL are referred to as the X-axis and the Y-axis. The static optical axis AL, the X-axis, and the Y-axis are orthogonal to one another. The X-axis passes through a first magnet 131, which will be described later, and is parallel to a direction in which the first magnet 131 and a holder 12 face each other. A direction parallel to the X-axis is referred to as "X-axis direction". Of the X-axis directions, a direction from the holder 12 toward the first magnet 131 is referred to as "direction X1", and a direction from the first magnet 131 toward the holder 12 is referred to as "direction X2". The Y-axis passes through a second magnet 132, which will be described later, and is parallel to a direction in which the second magnet 132 and the holder 12 face each other. A direction parallel to the Y-axis is referred to as "Y-axis direction". Of the Y-axis directions, a direction from the holder 12 toward the second magnet 132 is referred to as "direction Y1", and a direction from the second magnet 132 toward the holder 12 is referred to as "direction Y2".

Additionally, for example, a direction orthogonal to a predetermined axis such as the static optical axis AL and a rotation axis AR described later is referred to as the "radial direction" of the axis. Of the radial directions, a direction approaching the axis is referred to as "radially inward", and a direction separating from the axis is referred to as "radially outward". In each component, an end portion in the radially inner direction is referred to as "radially inner end portion", and an end portion in the radially outer direction is referred to as "radially outer end portion". Additionally, of the side surfaces of each component, a side surface facing radially inward is referred to as "radially inner side surface", and a side surface facing radially outward is referred to as "radially outer side surface".

Additionally, for example, a rotation direction centered on a predetermined axis such as the static optical axis AL and the rotation axis AR described later is referred to as the "circumferential direction" of the axis.

Additionally, in a positional relationship between any one and another of the azimuths, lines, and surfaces, "parallel" includes not only a state in which the two endlessly extend without intersecting, but also a state in which the two are substantially parallel. Additionally, "perpendicular" and "orthogonal" include not only a state in which the two intersect at 90 degrees, but also a state in which the two are substantially perpendicular to each other and a state in which the two are substantially orthogonal to each other. That is, "parallel", "perpendicular", and "orthogonal" each includes a state in which the positional relationship between the two includes an angle shift that does not depart from the gist of the present disclosure.

Note that the matters described above are not strictly applied in a case of incorporating into an actual device.

The optical assembly 100 with a shake correction function has a shake correction function for correcting a shake of the optical module 11 described later. Hereinafter, the optical assembly 100 with a shake correction function will be referred to as an "optical assembly 100".

Figure 2:
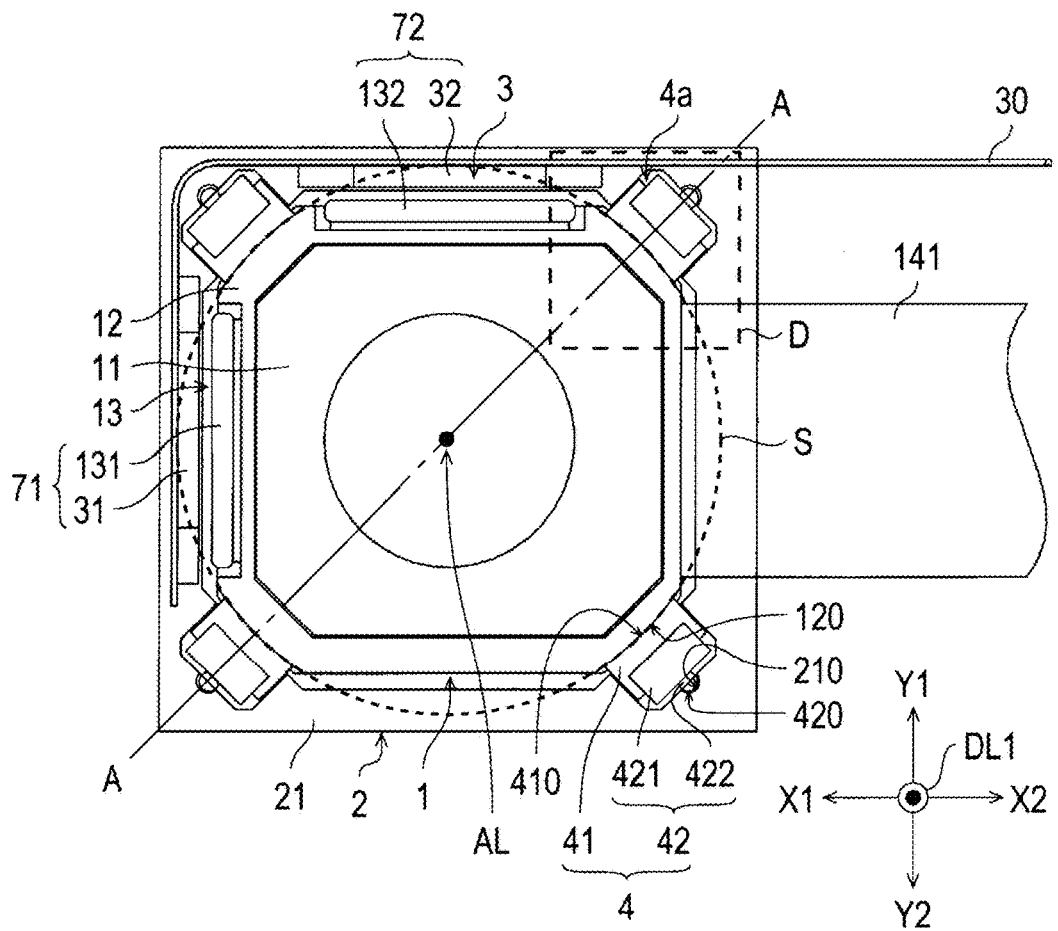
FIG. 2 is a plan view of the optical assembly according to an example embodiment of the present invention as viewed from one side in the optical axis direction.
Figure 3:
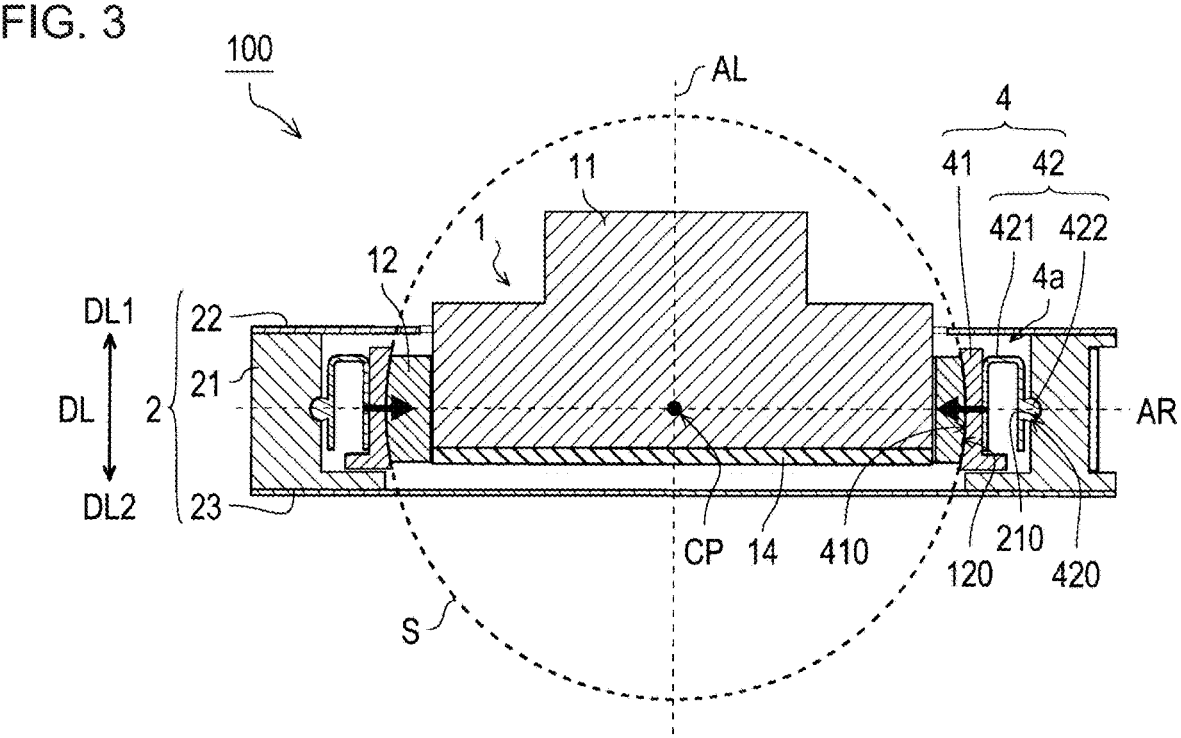
FIG. 3 is an A-A sectional view of the optical assembly according to the example embodiment of FIG. 2.

FIG. 1 is a perspective view of the optical assembly 100. FIG. 2 is a plan view of the optical assembly 100 according to an example embodiment as viewed from the one optical axis direction DL1 side. FIG. 3 is an A-A sectional view of the optical assembly 100 according to the example embodiment. Note that in order to facilitate understanding of the internal configuration, in FIG. 2, a top cover 22 is omitted and a frame body 21 is shown transparently. Additionally, FIG. 3 shows a sectional structure of the optical assembly 100 including the static optical axis AL and cut along a virtual plane along line A-A of FIG. 2.

The optical assembly 100 includes the movable body 1, the fixed body 2, multiple coils 3, a flexible printed circuit board 30, and multiple support portions 4 having a guide portion 41 and a preload portion 42. The optical assembly 100 is mounted on a smartphone with a camera, an imaging device such as a photo camera and a video camera, an action camera mounted on a mobile unit such as a drone, and the like. When the movable body 1 tilts from the vertical direction, the optical assembly 100 corrects the tilt of the movable body 1 on the basis of detection results such as acceleration, angular velocity, and deflection amount in the three-dimensional direction detected by a sensor such as a gyroscope (not shown), and the deflection of the optical axis of the optical module 11 of the movable body 1 is corrected.

The movable body 1 can swing about a swing center CP with respect to the fixed body 2. The swing center CP is a rotation center when the movable body 1 rotates in the pitching direction and the yawing direction, for example. The movable body 1 has the optical module 11 and the holder 12 for holding the optical module 11. As described above, the optical assembly 100 includes the movable body 1. Additionally, the optical assembly 100 has the optical module 11 and the holder 12.

In the present example embodiment, the optical module 11 is a rectangular parallelepiped camera module having a lens (not shown).

The holder 12 is made of resin in the present example embodiment, is arranged radially outward of the optical module 11, and surrounds the optical module 11 in the circumferential direction centered on the optical axis direction DL. The holder 12 is attached to the radially outer side surface of the optical module 11.

The holder 12 has a first convex surface 120 that protrudes toward the support portion 4. In other words, the movable body 1 has the first convex surface 120 that protrudes toward the guide portion 41. The first convex surface 120 is arranged on the radially outer side surface of the holder 12, and faces the support portion 4 in the radial direction with respect to the optical axis direction DL in a state where the movable body 1 is stationary. For example, in FIG. 3, the first convex surface 120 extends along the surface of a virtual sphere S centered on the swing center CP of the movable body 1. That is, the first convex surface 120 has a spherical shape centered on the swing center CP. Note, however, that the present disclosure is not limited to this example, and the first convex surface 120 may have a spherical shape centered on a position different from the swing center CP inside the movable body 1.

Additionally, the movable body 1 further has multiple magnets 13. In the present example embodiment, the multiple magnets 13 include the first magnet 131 and the second magnet 132.

The first magnet 131 is arranged at the radially outer end portion of the holder 12 on the direction X1 side. More specifically, a first magnet holding hole (reference numeral omitted) recessed in the direction X2 is formed at the radially outer end portion of the holder 12 on the direction X1 side. At least a part of the first magnet 131 is housed in the first magnet holding hole together with a first yoke (not shown). Note, however, that the present disclosure is not limited to this example, and the first magnet 131 may be fixed on the radially outer side surface of the holder 12 on the direction X1 side.

The second magnet 132 is arranged at the radially outer end portion of the holder 12 on the direction Y1 side. More specifically, a second magnet holding hole (reference numeral omitted) recessed in the direction Y2 is formed at the radially outer end portion of the holder 12 on the direction Y1 side. At least a part of the second magnet 132 is housed in the second magnet holding hole together with a second yoke (not shown). Note, however, that the present disclosure is not limited to this example, and the second magnet 132 may be fixed on the radially outer side surface of the holder 12 on the direction Y1 side.

The present disclosure is not limited to the example of the present example embodiment, and the magnet 13 may further have at least one of a third magnet arranged at a radially outer end portion of the holder 12 on the direction X2 side and a fourth magnet arranged at a radially outer end portion of the holder 12 on the direction Y2 side. The third magnet and the fourth magnet can be arranged in the same manner as the first magnet 131 and the second magnet 132.

Additionally, the movable body 1 further has a plate-shaped substrate 14 extending in a direction perpendicular to the optical axis of the optical module 11 and a flexible printed circuit board 141. The substrate 14 is arranged on the other optical axis direction end surface of the optical module 11. For example, a power supply circuit and a drive circuit of the optical module 11 are mounted on the substrate 14. The flexible printed circuit board 141 extends in the direction X2 from an end portion of the substrate 14 on the direction X2 side, and is pulled out to the outside of the optical assembly 100. The flexible printed circuit board 141 electrically connects the optical module 11 to an apparatus, a device, a circuit, or the like arranged outside the optical assembly 100 through the substrate 14.

The fixed body 2 has the frame body 21, the top cover 22, and a bottom cover 23.

The frame body 21 is arranged radially outward of the movable body 1 in the radial direction with respect to the static optical axis AL. The optical assembly 100 includes the frame body 21. The frame body 21 surrounds the holder 12 about the static optical axis AL. More specifically, the frame body 21 is made of resin in the present example embodiment, and surrounds the holder 12 in the circumferential direction centered on the optical axis direction DL.

The top cover 22 is arranged at one optical axis direction end portion of the holder 12. An opening (reference numeral omitted) penetrates the center of the top cover 22 in the thickness direction. A part of the optical module 11 (e.g., lens of camera module) is exposed to the outside of the optical assembly 100 through the opening.

The bottom cover 23 has a plate shape that extends in a direction perpendicular to the static optical axis AL. The bottom cover 23 is arranged on a portion on the other side in the optical axis direction of the holder 12, and covers a portion on the other side in the optical axis direction of the movable body 1 and the holder 12. Note that the present disclosure is not limited to the example of the present example embodiment, and the top cover 22 and the bottom cover 23 may be omitted.

The multiple coils 3 include a first coil 31 and a second coil 32.

The first coil 31 is arranged in a portion of the frame body 21 on the direction X1 side of the movable body 1, and faces the first magnet 131 in the X-axis direction. In the present example embodiment, a first coil holding hole (reference numeral omitted) recessed in the direction X2 is formed at the radially outer end portion of the above-mentioned portion. At least a part of the first coil 31 is housed in the first coil holding hole. Note that the present disclosure is not limited to the example of the present example embodiment, and the first coil holding hole may be formed at the radially inner end portion of the above-mentioned portion, and be recessed in the direction X1. Alternatively, the first coil holding hole may penetrate the above-mentioned portion in the X-axis direction. Alternatively, the first coil 31 may be arranged on the radially inner side surface or the radially outer side surface of the above-mentioned portion of the frame body 21.

The second coil 32 is arranged in a portion of the frame body 21 on the direction Y1 side of the movable body 1, and faces the second magnet 132 in the Y-axis direction. In the present example embodiment, a second coil holding hole (reference numeral omitted) recessed in the direction Y2 is formed at the radially outer end portion of the above-mentioned portion. At least a part of the second coil 32 is housed in the second coil holding hole. Note that the present disclosure is not limited to the example of the present example embodiment, and the second coil holding hole may be formed at the radially inner end portion of the above-mentioned portion, and be recessed in the direction Y1. Alternatively, the second coil holding hole may penetrate the above-mentioned portion in the Y-axis direction. Alternatively, the second coil 32 may be arranged on the radially inner side surface or the radially outer side surface of the above-mentioned portion of the frame body 21.

The first coil 31 forms a first magnetic drive mechanism 71 together with the first magnet 131. The first magnetic drive mechanism 71 generates a driving force for rotating the movable body 1 in the circumferential direction centered on the Y-axis direction by energizing the first coil 31. The second coil 32 forms a second magnetic drive mechanism 72 together with the second magnet 132. The second magnetic drive mechanism 72 generates a driving force for rotating the movable body 1 in the circumferential direction centered on the X-axis direction by energizing the second coil 32. The optical assembly 100 appropriately rotates the movable body 1 by the driving force of the first magnetic drive mechanism 71 and the second magnetic drive mechanism 72 to correct the deflection of the optical axis of the optical module 11 in the pitching direction and the yawing direction, for example.

Note that in the first magnetic drive mechanism 71 and the second magnetic drive mechanism 72, in the present example embodiment, the magnet 13 is arranged on the movable body 1 and the coil 3 is arranged on the fixed body 2. Note, however, that the present disclosure is not limited to this example, and the magnet 13 may be arranged on the fixed body 2 and the coil 3 may be arranged on the movable body 1.

Additionally, in a case where the multiple magnets 13 have the aforementioned third magnet, the multiple coils 3 may further have a third coil. The third coil is arranged at the radially inner end portion of a portion of the frame body 21 on the direction X2 side of the movable body 1, and faces the third magnet in the X-axis direction. Additionally, in a case where the multiple magnets 13 have the aforementioned fourth magnet, the multiple coils 3 may further have a fourth coil. The fourth coil is arranged at the radially inner end portion of a portion of the frame body 21 on the direction Y2 side of the movable body 1, and faces the fourth magnet in the Y-axis direction. The arrangement and function of the third coil and the fourth coil can be similar to those of the first coil 31 and the second coil 32, respectively. For example, the third coil forms a third magnetic drive mechanism together with the third magnet, and the fourth coil forms a fourth magnetic drive mechanism together with the fourth magnet.

The flexible printed circuit board 30 is arranged on the radially outer side surface of the frame body 21 on the direction X1 side and the direction Y1 side. The flexible printed circuit board 30 electrically connects the first coil 31 and the second coil 32 to an apparatus, a device, a circuit, or the like arranged outside the optical assembly 100.

Multiple support portions 4 swingably support the movable body 1 with respect to the frame body 21. The optical assembly 100 includes multiple support portions 4. The multiple support portions 4 are arranged between the holder 12 of the movable body 1 and the frame body 21 of the fixed body 2, and are arranged in the circumferential direction centered on the static optical axis AL. Preferably, the number of support portions 4 is three or more. In this way, the support portion 4 can swingably support the movable body 1 in the pitching direction and the yawing direction centered on an axis perpendicular to the static optical axis AL. Moreover, since the movable body 1 can be supported by the support portion 4 at three or more locations arranged in the circumferential direction centered on the static optical axis AL, the movable body 1 can be made less likely to come off from the support portion 4. Note, however, that this example does not exclude a configuration in which the number of support portions 4 is two.

Additionally, as shown in FIG. 2, the multiple support portions 4 preferably include a pair of support portions 4a facing each other with the movable body 1 interposed therebetween when viewed from the optical axis direction DL. The pair of support portions 4a faces each other with the movable body 1 interposed therebetween when viewed from the optical axis direction DL. More preferably, as shown in FIG. 2, there are multiple pairs of support portions 4a. With this configuration, the movable body 1 is pushed from both sides in the direction in which the pair of support portions 4a face each other with the movable body 1 interposed therebetween when viewed from the optical axis direction DL. Accordingly, the movable body 1 is stably supported by the pair of support portions 4a in the direction in which the pair of support portions 4a faces each other, and even if an impact is applied to the optical assembly 100, for example, the movable body 1 is unlikely to come off from the support portion 4. Hence, the strength of the optical assembly 100 can be improved. Note, however, that this example does not exclude a configuration in which the multiple support portions 4 do not include the pair of support portions 4a.

Preferably, the multiple support portions 4 are arranged at equal intervals in the circumferential direction centered on the static optical axis AL. The movable body 1 can be supported more stably by the multiple evenly arranged support portions 4, and the movable body 1 is even less likely to come off from the support portion 4. Note, however, that the present disclosure is not limited to this example, and the multiple support portions 4 may be arranged at different intervals in the above-mentioned circumferential direction.

Next, as described above, the support portion 4 has the guide portion 41 and the preload portion 42.

The guide portion 41 is arranged between the movable body 1 and the frame body 21 to support the movable body 1. The guide portion 41 can be displaced with respect to the movable body 1 and the frame body 21 in the radial direction with respect to the static optical axis AL.

The guide portion 41 has a first concave surface 410 in contact with the first convex surface 120. As described above, the movable body 1 has the first convex surface 120. Note, however, that the present disclosure is not limited to the example of the present example embodiment, and the guide portion 41 may have the first convex surface 120, and the first convex surface 120 may protrude from the guide portion 41 toward the movable body 1. That is, the movable body 1 may have the first concave surface 410, and the first concave surface 410 may be recessed from the guide portion 41 toward the movable body 1 and be in contact with the first convex surface 120. That is, one of the movable body 1 and the guide portion 41 may have the first convex surface 120 that protrudes from the one to the other of the movable body 1 and the guide portion 41. Moreover, the other of the movable body 1 and the guide portion 41 may have the first concave surface 410 in contact with the first convex surface 120.

The first convex surface 120 and the first concave surface 410 have a spherical shape, and in the present example embodiment, have a spherical shape having the same center point. For example, in FIG. 3, the first concave surface 410 extends along the surface of the virtual sphere S centered on the swing center CP of the movable body 1. That is, the first concave surface 410 has a spherical shape centered on the swing center CP. Note, however, that the present disclosure is not limited to this example, and the first concave surface 410 may have a spherical shape centered on a position different from the swing center CP inside the movable body 1. Additionally, the first concave surface 410 may have a spherical shape having a center point different from that of the first convex surface 120.

Additionally, the radius of curvature of the first convex surface 120 is equal to or less than the radius of curvature of the first concave surface 410. For example, by setting the radius of curvature of the first convex surface 120 to be the same as the radius of curvature of the first concave surface 410, the first convex surface 120 fits the first concave surface 410, and therefore the support portion 4 can stably support the movable body 1. Alternatively, by setting the radius of curvature of the first convex surface 120 to be smaller than the radius of curvature of the first concave surface 410, a lubricating material such as grease can be injected between the first convex surface 120 and the first concave surface 410, for example. As a result, the movable body 1 can be swung more smoothly with respect to the support portion 4. Note, however, that the present disclosure is not limited to these examples, and the radius of curvature of the first convex surface 120 may be set to be larger than the radius of curvature of the first concave surface 410.

The preload portion 42 is arranged between the frame body 21 and the guide portion 41. The radially inner end portion of the preload portion 42 is connected to the radially outer end portion of the guide portion 41. The radially outer end portion of the preload portion 42 is supported by the frame body 21. The preload portion 42 can be expanded and contracted in the radial direction with respect to the static optical axis AL, and can generate elastic force by expansion and contraction. The preload portion 42 pushes the guide portion 41 toward the movable body 1 by the elastic force. For this reason, even if an impact is applied to the optical assembly 100, for example, the movable body 1 is unlikely to come off from the support portion 4. In the present example embodiment, as shown in FIG. 3, the preload portion 42 pushes the guide portion 41 toward the swing center CP of the movable body 1. At this time, for example, the forces acting on the movable body 1 from the preload portions 42 of the support portions 4 through the guide portions 41 are balanced at the swing center CP of the movable body 1. With this configuration, the movable body 1 can stably swing without displacing the swing center CP of the movable body 1 in the optical axis direction DL, even with the forces acting thereon as described above. Note that the configuration of the preload portion 42 will be described in more detail below.

According to the optical assembly 100 of the present example embodiment, the first convex surface 120 and the first concave surface 410 in contact with the first convex surface 120 have a spherical shape having the same center point. Hence, even if the movable body 1 is pressed by the preload portion 42 through the guide portion 41, the movable body 1 can swing sufficiently. Additionally, since the preload portion 42 pushes the guide portion 41 toward the movable body 1, it is possible to prevent the movable body 1 from coming off from the support portion 4 even if an impact is applied to the optical assembly 100, for example. Accordingly, the movable body 1 can be swingably supported without arranging multiple balls between the movable body 1 and the frame body 21. Additionally, since omission of the multiple balls simplifies assembly of the optical assembly 100, productivity of the optical assembly 100 can be improved.

Moreover, as compared with an optical assembly including a gimbal mechanism, the optical assembly 100 of the present example embodiment can easily reduce the size of the optical assembly 100 in the optical axis direction DL. For example, an optical assembly including a gimbal mechanism has an inner frame that allows an optical module to swing around a rotation axis in the pitching direction, and an outer frame that allows the inner frame to swing around a rotation axis in the yawing direction. For this reason, when the optical module swings, a space is required for the inner frame and the outer frame to move up and down in the optical axis direction. On the other hand, the optical assembly 100 of the present example embodiment does not require such a space.

The movable body 1 may sometimes rotate in the rolling direction in addition to the pitching direction and the yawing direction. The rolling direction of the movable body 1 is a circumferential direction centered on the static optical axis AL. The rotation in the rolling direction can be curbed to some extent by the first magnetic drive mechanism 71 and the second magnetic drive mechanism 72. Note, however, that if the movable body 1 largely rotates in the rolling direction, the first magnetic drive mechanism 71 and the second magnetic drive mechanism 72 may not be able to curb the rotation.

Figure 4:
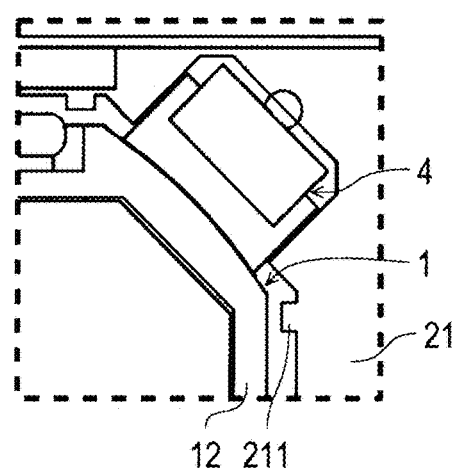
FIG. 4 is an enlarged plan view of the vicinity of a support portion of the optical assembly.

In consideration of such a case, as shown in FIG. 4, the frame body 21 may have a rotation curbing portion 211 that comes into contact with the movable body 1 when the movable body 1 rotates in the rolling direction. Alternatively, the present disclosure is not limited to the example of FIG. 4, and the movable body 1 may have the rotation curbing portion 211. That is, one of the frame body 21 and the movable body 1 may have the rotation curbing portion 211. When the movable body 1 rotates in the circumferential direction centered on the static optical axis AL, the rotation curbing portion 211 comes into contact with the other of the frame body 21 and the movable body 1. With this configuration, it is possible to curb rotation of the movable body 1 in the rolling direction about the static optical axis AL.

Next, the configuration of the preload portion 42 will be described with reference to FIGS. 2 and 3. The preload portion 42 has an elastic body 421 and a contact portion 422.

The radially inner end portion of the elastic body 421 is connected to the guide portion 41. The contact portion 422 is arranged at the radially outer end portion of the elastic body 421. The radially outer end portion of the elastic body 421 is supported by the frame body 21 through the contact portion 422. The preload portion 42 can push the guide portion 41 toward the movable body 1 by the elastic force of the elastic body 421.

The elastic body 421 is a leaf spring in the present example embodiment. The leaf spring has two plate-shaped portions and a connecting portion. When viewed from the circumferential direction centered on the static optical axis AL, the two plate-shaped portions extend in parallel in the optical axis direction DL, and the connecting portion radially connects end portions of the plate-shaped portions in the optical axis direction. That is, the leaf spring has a so-called U shape. By using a leaf spring for the elastic body 421, the elastic body 421 can be arranged in a small space. Additionally, by adopting an inexpensive leaf spring for the elastic body 421, the manufacturing cost can be reduced. Accordingly, productivity of the optical assembly 100 can be improved. Note, however, that the present disclosure is not limited to this example, and the elastic body 421 may be any member that can generate an elastic force. For example, the elastic body 421 may be a spring coil, a rubber member, or the like.

The contact portion 422 is fixed to the radially outer end portion of the elastic body 421 by means such as welding, adhesion using an adhesive, and soldering. Alternatively, the contact portion 422 may protrude radially outward from the radially outer end portion of the elastic body 421. In this case, the contact portion 422 may be a different part of the same member as the elastic body 421.

The contact portion 422 is in contact with the frame body 21. More specifically, the frame body 21 has multiple second concave surfaces 210 in the present example embodiment. The second concave surface 210 is formed on an inside portion of the frame body 21 in the radial direction, and is recessed outward in the radial direction with respect to the static optical axis AL. The contact portion 422 is in contact with the second concave surface 210.

Additionally, in the present example embodiment, the contact portion 422 has a second convex surface 420 formed at least at the radially outer end portion of the contact portion 422. In other words, the preload portion 42 has the second convex surface 420 formed at the radially outer end portion of the preload portion 42. The second convex surface 420 protrudes radially outward with respect to the static optical axis AL and comes into contact with the second concave surface 210.

Note that the present disclosure is not limited to the example of the present example embodiment, and the contact portion 422 of the preload portion 42 may have the second concave surface 210 that is recessed radially inward, and the frame body 21 may have the second convex surface 420 that protrudes radially inward. That is, it is sufficient that one of the frame body 21 and the preload portion 42 has the second convex surface 420 protruding from the one toward the other. Additionally, it is sufficient that the other of the frame body 21 and the preload portion 42 has the second concave surface 210 that is recessed from one toward the other and is in contact with the second convex surface 420.

As a result, since the second convex surface 420 of one of the frame body 21 and the preload portion 42 comes into contact with the second concave surface 210 of the other, the frame body 21 can support the preload portion 42, and the preload portion 42 can be made rotatable about at least a part of the portion where the convex surface 420 contacts the second concave surface 210. Moreover, the preload portion 42 is pushed toward the frame body 21 by the reaction force when the preload portion 42 pushes the guide portion 41. For this reason, when the preload portion 42 rotates with respect to the frame body 21, the preload portion 42 is supported by the frame body 21 at a position where it can rotate stably. That is, even if the preload portion 42 deviates from a position where it can rotate stably before rotation, the preload portion 42 moves to the above-mentioned position by rotation with respect to the frame body 21, and is stably supported. Accordingly, the swinging of the movable body 1 becomes more stable.

The second convex surface 420 and the second concave surface 210 are both curved surfaces. The second convex surface 420 and the second concave surface 210 preferably have spherical shapes, and more preferably have spherical shapes having the same center. The radius of curvature of the second convex surface 420 is equal to or less than the radius of curvature of the second concave surface 210. By setting the radius of curvature of the second convex surface 420 to be the same as the radius of curvature of the second concave surface 210, the second convex surface 420 fits the second concave surface 210, and therefore the frame body 21 can stably support the preload portion 42. Additionally, by setting the radius of curvature of the second convex surface 420 to be smaller than the radius of curvature of the second concave surface 210, the contact area between the second convex surface 420 and the second concave surface 210 can be made narrower, and therefore the sliding resistance between the two can be made smaller. Accordingly, the swinging of the movable body 1 can be further stabilized.

Note that in the present example embodiment, the contact portion 422 is a spherical member arranged at the radially outer end portion of the elastic body 421. Note, however, that the shape of the contact portion 422 is not limited to this example. For example, the contact portion 422 may have a columnar shape extending radially outward.

Additionally, in the present example embodiment, the contact surface in which the contact portion 422 contacts the frame body 21 is a spherical curved surface, for example. Note, however, that the present disclosure is not limited to this example, and one or multiple convex portions protruding radially outward may be formed on the contact surface, and the tip end of the convex portions may be in contact with the frame body 21.

Next, first to third modifications of the example embodiment will be described. Hereinafter, configurations different from the above-described example embodiment and other modifications will be described. Additionally, components similar to those of the above-described example embodiment and other modifications are assigned the same reference numerals, and the description of similar configurations and similar components may be omitted.

Figure 5:
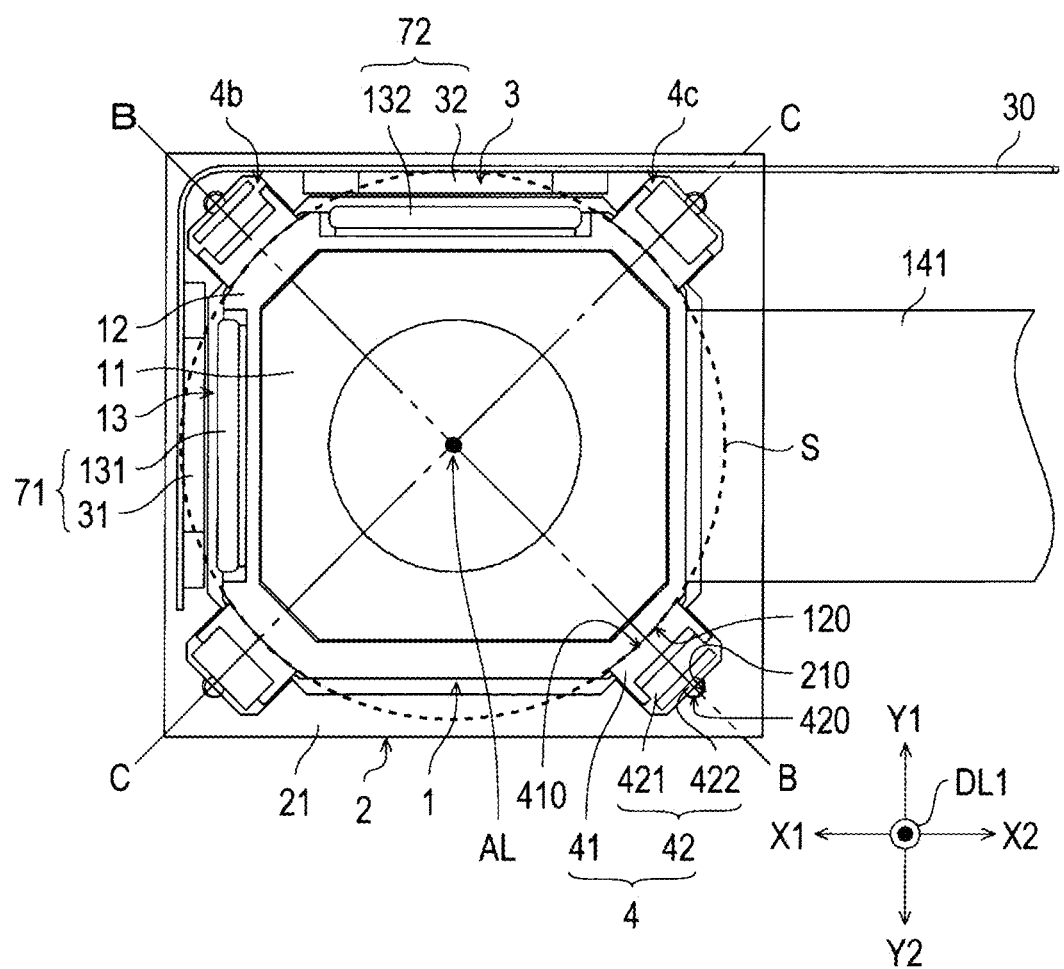
FIG. 5 is a plan view of an optical assembly according to a first modification of an example embodiment of the present invention as viewed from one side in the optical axis direction.
Figure 6A:
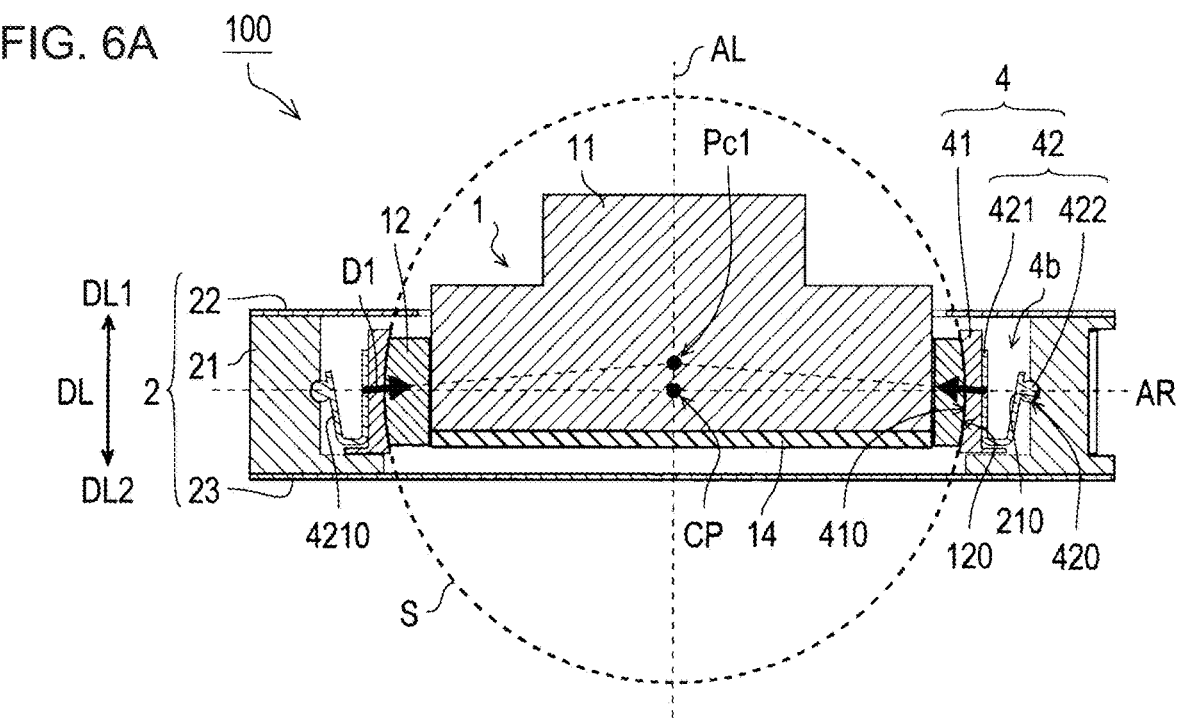
FIG. 6A is a B-B sectional view of the optical assembly according to the first modification of FIG. 5.
Figure 6B:
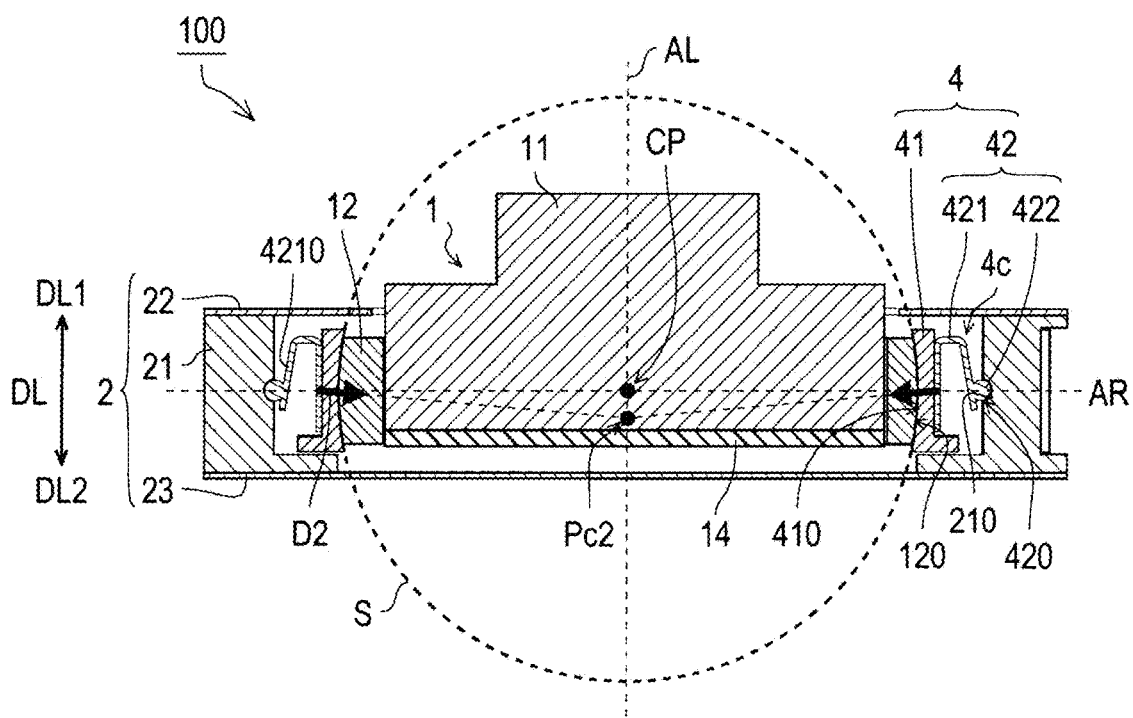
FIG. 6B is a C-C sectional view of the optical assembly according to the first modification of FIG. 5.

FIG. 5 is a plan view of an optical assembly 100 according to a first modification as viewed from the one optical axis direction DL1. FIG. 6A is a B-B sectional view of the optical assembly 100 according to the first modification. FIG. 6B is a C-C sectional view of the optical assembly 100 according to the first modification. Note that in order to facilitate understanding of the internal configuration, in FIG. 5, a top cover 22 is omitted and a frame body 21 is shown transparently. Additionally, FIG. 6A shows a sectional structure of the optical assembly 100 including the static optical axis AL and cut along a virtual plane along line B-B of FIG. 5. FIG. 6B shows a sectional structure of the optical assembly 100 including the static optical axis AL and cut along a virtual plane along line C-C of FIG. 5.

In the first modification, multiple support portions 4 include a first support portion 4b and a second support portion 4c. As shown in FIG. 5, when viewed from the optical axis direction DL, the first support portion 4b and the second support portion 4c make a pair and face each other with a movable body 1 interposed therebetween.

In the first support portion 4b, a preload portion 42 pushes a guide portion 41 in a first direction D1 of FIG. 6A. The first direction D1 is directed toward the one optical axis direction DL1 side of the swing center CP of the movable body 1. In other words, the first direction D1 is directed toward the one optical axis direction DL1 as it extends inward in the radial direction with respect to the static optical axis AL. Preferably, the first directions D1 intersect on the static optical axis AL.

In the second support portion 4c, the preload portion 42 pushes the guide portion 41 in a second direction D2 of FIG. 6B. The second direction D2 is directed toward the other optical axis direction DL2 side of the swing center CP of the movable body 1. In other words, the second direction D2 is directed toward the other optical axis direction DL2 as it extends inward in the radial direction with respect to the static optical axis AL. Preferably, the second directions D2 intersect on the static optical axis AL.

With this configuration, the force in the first direction D1 and the force in the second direction D2 acting on the movable body 1 are balanced in the optical axis direction DL. Hence, the movable body 1 can be stably supported, and in particular, displacement of the swing center CP of the movable body 1 in the optical axis direction DL can be curbed. Moreover, even if an impact is applied to the optical assembly 100, the support of the movable body 1 by the support portion 4 does not easily come off in the optical axis direction DL. Accordingly, the strength of the optical assembly 100 can be improved.

The forces in the first direction D1 and the forces in the second direction D2 are preferably balanced on the static optical axis AL, and more preferably balanced on the swing center CP. As a result, the movable body 1 can be supported more stably while preventing the displacement of the swing center CP of the movable body 1. Moreover, the strength of the optical assembly 100 can be further improved.

Note that in FIG. 6A, in the first support portion 4b, a radially outer portion 4210 of the leaf spring, which is an elastic body 421 connected to the radially outer end portion of the guide portion 41, extends radially outward toward the one optical axis direction DL1. In FIG. 6B, in the second support portion 4c, the radially outer portion 4210 of the leaf spring, which is the elastic body 421 connected to the radially outer end portion of the guide portion 41, extends radially outward toward the other optical axis direction DL2. Note that the above portion 4210 is a radially outer portion of the pair of plate-shaped portions of the leaf spring extending in the optical axis direction DL.

In FIGS. 6A and 6B, by deforming the leaf spring as described above, the force in the first direction D1 is caused to act on the movable body 1 and the force in the second direction D2 is caused to act on the movable body 1. Note, however, that the configuration in which the force in the first direction and the force in the second direction are caused to act on the movable body 1 is not limited to the example of FIGS. 6A and 6B.

Figure 7A:
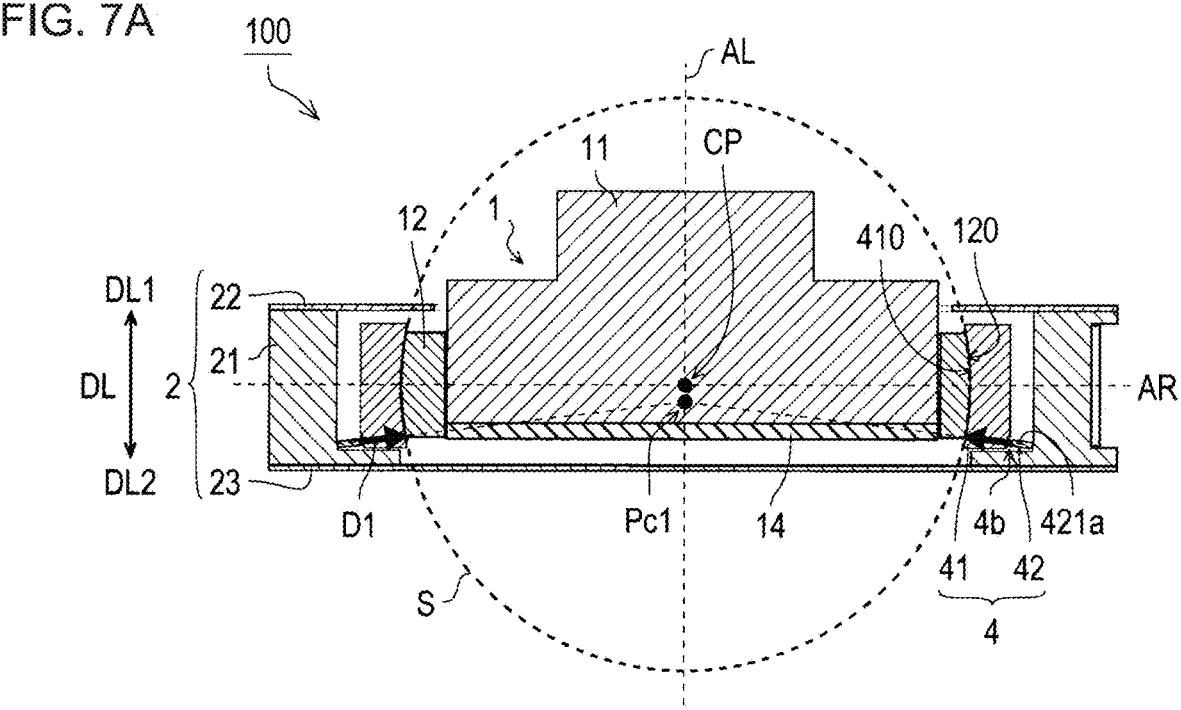
FIG. 7A is a B-B sectional view of an optical assembly according to a second modification of an example embodiment of the present invention.
Figure 7B:
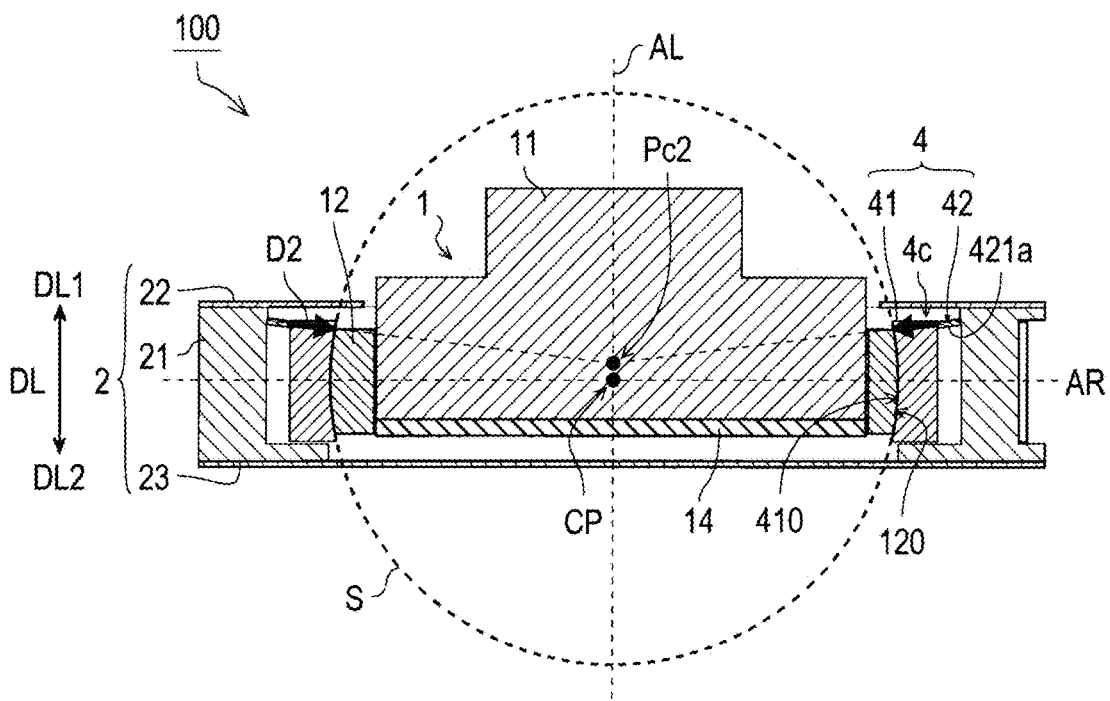
FIG. 7B is a C-C sectional view of the optical assembly according to the second modification of an example embodiment of the present invention.

FIG. 7A is a B-B sectional view of an optical assembly 100 according to a second modification. FIG. 7B is a C-C sectional view of the optical assembly 100 according to the second modification. Note that FIG. 7A corresponds to the sectional structure of the optical assembly 100 including the static optical axis AL and cut along the virtual plane along line B-B of FIG. 5. FIG. 7B corresponds to the sectional structure of the optical assembly 100 including the static optical axis AL and cut along the virtual plane along line C-C of FIG. 5.

For example, as shown in FIGS. 7A and 7B, in the second modification, a preload portion 42 has an elastic member 421a (e.g., spring coil or linear member made of rubber). The elastic force generated by the elastic member 421a acts in a direction in which the elastic member 421a extends. As shown in FIG. 7A, the elastic member 421a of the first support portion 4b is arranged on the other optical axis direction DL2 side of the swing center CP. Moreover, in the first support portion 4b, the elastic member 421a extends in the one optical axis direction DL1 from the frame body 21 toward the guide portion 41. Additionally, as shown in FIG. 7B, the elastic member 421a of the second support portion 4c is arranged on the one optical axis direction DL1 side of the swing center CP. Moreover, in the second support portion 4c, the elastic member 421a extends in the other optical axis direction DL2 from the frame body 21 toward the guide portion 41. Even with this configuration, the force in the first direction D1 and the force in the second direction D2 can be caused to act on the movable body 1.

Note that in FIG. 7A, the first direction D1 in which the elastic member 421a of the first support portion 4b pushes the movable body 1 is directed toward the one optical axis direction DL1 side of the swing center CP of the movable body 1. In FIG. 7B, the second direction D2 in which the elastic member 421a of the second support portion 4c pushes the movable body 1 is directed toward the other optical axis direction DL2 side of the swing center CP of the movable body 1. Note, however, that the present disclosure is not limited to the example of FIGS. 7A and 7B, and the first direction D1 may be directed toward the other optical axis direction DL2 side of the swing center CP of the movable body 1, and the second direction D2 may be directed toward the one optical axis direction DL1 side of the swing center CP of the movable body 1. Alternatively, the first direction D1 and the second direction D2 may both be directed toward the swing center CP of the movable body 1. In either case, it is sufficient that the force in the first direction D1 and the force in the second direction D2 are balanced in the optical axis direction DL, and preferably are balanced at the swing center CP of the movable body 1.

Figure 8A:
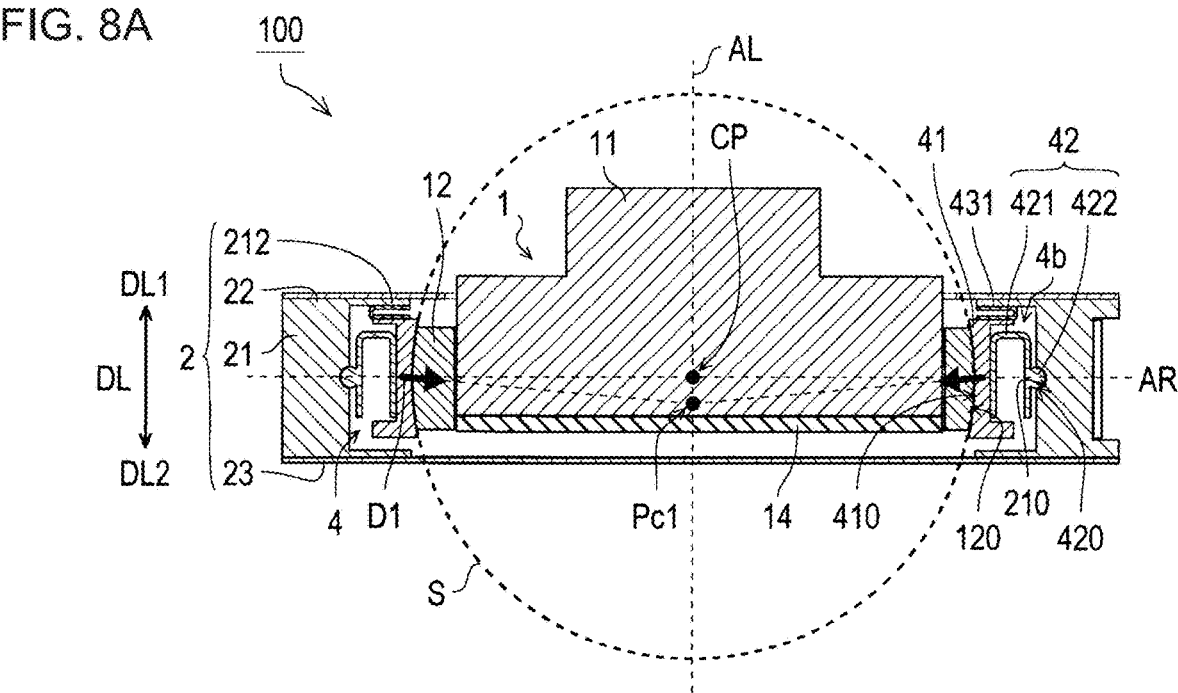
FIG. 8A is a B-B sectional view of an optical assembly according to a third modification of an example embodiment of the present invention.
Figure 8B:
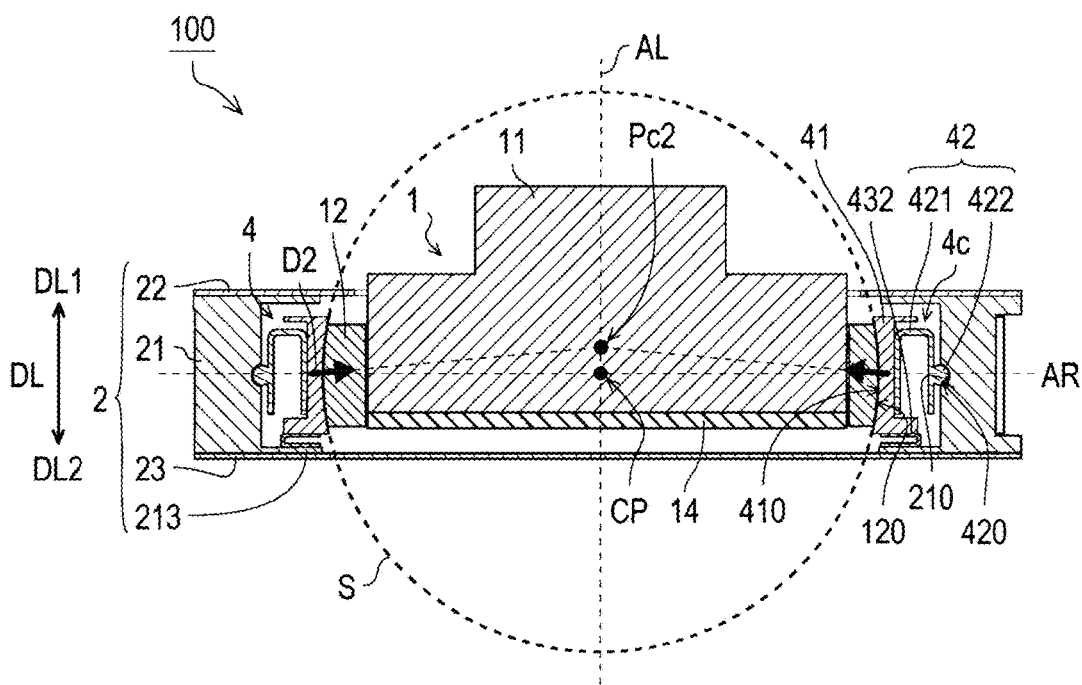
FIG. 8B is a C-C sectional view of the optical assembly according to the third modification of an example embodiment of the present invention.

FIG. 8A is a B-B sectional view of an optical assembly 100 according to a third modification. FIG. 8B is a C-C sectional view of the optical assembly 100 according to the third modification. Note that FIG. 8A corresponds to the sectional structure of the optical assembly 100 including the static optical axis AL and cut along the virtual plane along the line B-B of FIG. 5. FIG. 8B corresponds to the sectional structure of the optical assembly 100 including the static optical axis AL and cut along the virtual plane along line C-C of FIG. 5.

In the third modification, a first support portion 4b further has a first elastic member 431 that pushes a guide portion 41 in the other optical axis direction DL2. Additionally, a second support portion 4c further has a second elastic member 432 that pushes the guide portion 41 in the one optical axis direction DL1. The first elastic member 431 and the second elastic member 432 are both leaf springs in the present example embodiment, but may be spring coils or rubber members.

A fixed body 2 has a first flange portion 212 and a second flange portion 213. The first flange portion 212 extends radially inward from one optical axis direction end portion of the radially inner end portion of the frame body 21. The other optical axis direction end portion of the first flange portion 212 faces the one optical axis direction end portion of the guide portion 41 of the first support portion 4b and the optical axis direction DL. The second flange portion 213 extends radially inward from the other optical axis direction end portion of the radially inner end portion of the frame body 21. The one optical axis direction end portion of the second flange portion 213 faces the other optical axis direction end portion of the guide portion 41 of the second support portion 4c and the optical axis direction DL.

As shown in FIGS. 8A and 8B, in the third modification, the first flange portion 212 and the second flange portion 213 are formed on the frame body 21. Then, as shown in FIG. 8A, in the first support portion 4b, the first elastic member 431 is arranged between the one optical axis direction end portion of the guide portion 41 and the first flange portion 212. Moreover, as shown in FIG. 8B, in the second support portion 4c, the second elastic member 432 is arranged between the other optical axis direction end portion of the guide portion 41 and the second flange portion 213. Even with this configuration, the force in the first direction D1 and the force in the second direction D2 can be caused to act on the movable body 1.

Note that in FIG. 8A, the first direction D1 in which the first elastic member 431 of the first support portion 4b pushes a movable body 1 is directed toward the other optical axis direction DL2 side of a swing center CP of the movable body 1. In FIG. 8B, the second direction D2 in which the second elastic member 432 of the second support portion 4c pushes the movable body 1 is directed toward the one optical axis direction DL1 side of the swing center CP of the movable body 1. Note, however, that the present disclosure is not limited to the example of FIGS. 8A and 8B, and the first direction D1 may be directed toward the one optical axis direction DL1 side of the swing center CP of the movable body 1, and the second direction D2 may be directed toward the other optical axis direction DL2 side of the swing center CP of the movable body 1. Alternatively, the first direction D1 and the second direction D2 may both be directed toward the swing center CP of the movable body 1. In either case, it is sufficient that the force in the first direction D1 and the force in the second direction D2 are balanced in the optical axis direction DL, and preferably are balanced at the swing center CP of the movable body 1.

The present disclosure is useful for devices in which a fixed body swingably supports a movable body, and is particularly useful for optical devices in which the movable body has an optical module.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical assembly with a shake correction function to correct a shake of an optical module, the optical assembly comprising:
   a movable body that includes the optical module;
   a frame body radially outward of the movable body in a radial direction with respect to an optical axis of the optical module; and
   a plurality of support portions that swingably support the movable body with respect to the frame body; wherein
   each of the plurality of support portions includes a guide portion and a preload portion;
   the guide portion is between the movable body and the frame body to support the movable body;
   a radially inner end portion of the preload portion is connected to a radially outer end portion of the guide portion;
   a radially outer end portion of the preload portion is supported by the frame body;
   one of the movable body and the guide portion includes a first convex surface protruding from the one of the movable body and the guide portion toward another of the movable body and the guide portion;
   the another of the movable body and the guide portion includes a first concave surface in contact with the first convex surface;
   the first convex surface and the first concave surface have a spherical shape;
   the preload portion pushes the guide portion toward the movable body;
   one of the frame body and the preload portion includes a second convex surface protruding from the one of the frame body and the preload portion toward another of the frame body and the preload portion; and
   the another of the frame body and the preload portion includes a second concave surface that is recessed from the one of the frame body and the preload portion toward the other of the frame body and the preload portion and is in contact with the second convex surface.

2. The optical assembly according to claim 1, wherein a radius of curvature of the first convex surface is equal to or less than a radius of curvature of the first concave surface.

3. The optical assembly according to claim 1, wherein a total number of support portions is three or more.

4. The optical assembly according to claim 1, wherein the preload portion includes an elastic body;
   a radially inner end portion of the elastic body is connected to the guide portion; and
   a radially outer end portion of the elastic body is supported by the frame body.

5. The optical assembly according to claim 1, wherein the second convex surface and the second concave surface are both curved surfaces; and
   a radius of curvature of the second convex surface is equal to or less than a radius of curvature of the second concave surface.

6. The optical assembly according to claim 1, wherein a plurality of the support portions include a pair of the support portions opposing each other with the movable body interposed therebetween.

7. The optical assembly according to claim 1, wherein a plurality of the support portions are positioned at equal intervals in a circumferential direction centered on the optical axis of the optical module.

8. The optical assembly according to claim 1, wherein the preload portion pushes the guide portion toward a swing center of the movable body.

9. The optical assembly according to claim 1, wherein
   one of the frame body and the movable body includes a rotation curbing portion; and
   the rotation curbing portion is movable into contact with another of the frame body and the movable body when the movable body rotates in a circumferential direction centered on an optical axis of the optical module in a stationary state of the movable body.

10. An optical assembly with a shake correction function to correct a shake of an optical module, the optical assembly comprising:
    a movable body that includes the optical module;
    a frame body radially outward of the movable body in a radial direction with respect to an optical axis of the optical module; and
    a plurality of support portions that swingably support the movable body with respect to the frame body; wherein
    each of the plurality of support portions includes a guide portion and a preload portion;
    the guide portion is between the movable body and the frame body to support the movable body;
    a radially inner end portion of the preload portion is connected to a radially outer end portion of the guide portion;
    a radially outer end portion of the preload portion is supported by the frame body;
    one of the movable body and the guide portion includes a first convex surface protruding from the one of the movable body and the guide portion toward another of the movable body and the guide portion;
    the another of the movable body and the guide portion includes a first concave surface in contact with the first convex surface;
    the first convex surface and the first concave surface have a spherical shape;
    the preload portion pushes the guide portion toward the movable body; and
    the plurality of the support portions includes:
       a first support portion in which the preload portion pushes the guide portion in a first direction toward one side in an optical axis direction of a swing center of the movable body; and
       a second support portion in which the preload portion pushes the guide portion in a second direction toward the other side in the optical axis direction of the swing center of the movable body.

* * * * *